(12) United States Patent
Johny (10) Patent No.: US 10,394,844 B2
(45) Date of Patent: Aug. 27, 2019

(54) INTEGRATING CO-DEPLOYED DATABASES FOR DATA ANALYTICS

(71) Applicant: SAP SE, Walldorf (DE)

(72) Inventor: Jomerce Pullely Johny, Bangalore (IN)

(73) Assignee: SAP SE, Walldorf (DE)

( * ) Notice: Subject to any disclaimer, the term of this patent is extended or adjusted under 35 U.S.C. 154(b) by 331 days.

(21) Appl. No.: 14/935,450

(22) Filed: Nov. 9, 2015

(65) Prior Publication Data
US 2017/0132302 A1    May 11, 2017

(51) Int. Cl.
*G06F 17/30* (2006.01)
*G06F 16/27* (2019.01)

(52) U.S. Cl.
CPC .................... *G06F 16/27* (2019.01)

(58) Field of Classification Search
CPC ................................ G06F 17/30575
See application file for complete search history.

(56) References Cited

U.S. PATENT DOCUMENTS

| | | | |
|---|---|---|---|
| 2004/0059738 A1* | 3/2004 | Tarbell | G06F 17/30581 |
| 2009/0235185 A1* | 9/2009 | Gill | G06F 9/542 715/760 |
| 2015/0254257 A1* | 9/2015 | Kritchko | G06F 17/30575 707/634 |

* cited by examiner

*Primary Examiner* — Hung Q Pham
(74) *Attorney, Agent, or Firm* — Buckley, Maschoff & Talwalkar LLC (57) ABSTRACT

Various embodiments of systems and methods for integrating co-deployed databases are described herein. In an aspect, the method includes receiving an event from a source database. Based upon the event, a connector is triggered for synchronizing the source database and a destination database. The connector reads a mapping configuration to map corresponding data fields of the source database and the destination database. Based upon at least one of the received event and the mapping configuration, it is determined which data is to be read from the source database. The determined data is read from the source database and written to corresponding field of the destination database.

15 Claims, 6 Drawing Sheets

INTEGRATING CO-DEPLOYED DATABASES FOR DATA ANALYTICS

BACKGROUND

Databases are used for writing, storing, maintaining, and analyzing data related to business processes. Usually, a row-based or an object-oriented database is used for writing and storing data. In the row-based or the object-oriented database each record or entity may be recorded as a row or an object at a time. However, reading or retrieving data from the row or object-oriented database may be inefficient and time consuming. In the row-based or the object-oriented database, various unwanted data (e.g., some undesired data from a row or an object) may be required to be read before retrieving the required data from that row or object. Also, it may be required to read a preceding row or object to get to the required or desired row or object. Therefore, the row or object-oriented database may be inefficient and time consuming for reading data, retrieving data, and performing data analytics.

Usually, column database is used in data analytics to retrieve required data efficiently. In column database, the desired data can be retrieved directly from the column containing that data without reading the preceding column. Therefore, usually, it is desired to write or maintain data in the object-oriented database in real time and replicate the data in the column database so that efficient data analysis can be performed using the column database. The object-oriented database and the column database are required to be synchronized so that correct data analysis can be performed using the column database. Usually, a machine or a server is required or configured to connect and synchronize the object-oriented database and the column database. However, installing and configuring the machine or the server is an expensive and an arduous task. Further, if any data is updated in the object-oriented database, the entire row or object related to the updated data is read to update the corresponding data in the column database which again is a time consuming task.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments may be best understood from the following detailed description taken in conjunction with the accompanying drawings.

DESCRIPTION

Embodiments of techniques for integrating and synchronizing co-deployed databases for data analytics are described herein. In the following description, numerous specific details are set forth to provide a thorough understanding of the embodiments. One skilled in the relevant art will recognize, however, that the embodiments can be practiced without one or more of the specific details, or with other methods, components, materials, etc. in other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

"Row database" refers to a table-oriented database. Data in a row database may be managed using a pointer which refers to a location of row (e.g., location of row1, row2, etc). The pointer in the row database moves from one row to another. The pointer may be used for writing or reading data in the row database. The data is read or written row-wise. Once data related to a row is written of completed, the pointer moves to the next row. New record may then be written to the next row. Therefore, the data may be recorded or written efficiently in the row database as each record or row is written sequentially. Similarly, the data is read row-wise.

"Object-oriented database" refers to a data store in which information is represented in the form of objects. Data in an object-oriented database is also managed using a pointer. The pointer in the object-oriented database moves from one object to another. The pointer may be used for writing data in the object-oriented database. The data is written object-wise. Once data related to an object is written or completed, the pointer moves to write data related to a next object. Therefore, the data may be recorded or written more efficiently in the object-oriented database as data related to each object is written sequentially. Similarly, the data is read object-wise. In an embodiment, the object-oriented database may be termed as object store.

"Source database" refers to database used to efficiently write and store data. The source database gets updated in real time or at a predefined time interval. The source database is updated based upon the business process either automatically or manually. The row database or the object-oriented database may be used as the source database. The source database may not be efficiently used for retrieving or reading data or to perform data analytics. In an embodiment, the source database may be termed as source store.

"Column database" refers to database which stores data column-wise. The different fields are stored as different columns. In an embodiment, the column database may comprise multiple pointers, each pointer dedicated to corresponding column. Therefore, the columns can be read in parallel or together using multiple pointers to enable fast and efficient data analysis. In an embodiment, there may be a single pointer which can be placed directly onto the column whose data is to be analyzed/retrieved. The pointer may be directly moved to the required column. Therefore, the data can be retrieved or read fast and data analytics can be performed efficiently. The data may be written to the column database by moving pointer from one column to another to store one record or an object. In an embodiment, the column database may be termed as column store or destination database.

"Task" refers to an object configured to perform specific function, e.g., reading, writing, processing, accessing, displaying etc. There may be a separate memory dedicated to a task for storing and executing the task. In an embodiment, it may be determined whether a task for performing a function is predefined or is already created. If the task is already created, then an application or the user can activate or execute the task to perform the specific function. If the task is not pre-created, then the user or an application might create it dynamically when required. In an embodiment, the task may be predefined or configured at time of configuring a database. In an embodiment, the task may keep running for performing the specific function. The task may keep running when frequency for performing the function is more. In an embodiment, the task may be created or run when required, e.g., when frequency of performing the function is less. Thread can also be used to perform specific function like task. The thread is a light-weight object which does not require a specific or a dedicated memory. The thread can access any shared memory.

"Mapping table" refers to a configuration to associate each element of a first set (e.g., source table or database) with one or more elements of a second set (e.g., destination table or database). Therefore, the mapping table may be used to associate each element or field of the object-oriented database with respective element or column of the column database. The mapping table might be configured by the user. For example, the user might configure which column of the row database is mapped to which column of the column database or which field of the object-oriented database is mapped to which column of the column database. Mapping table may also be referred as mapping configuration or file.

Figure 1:
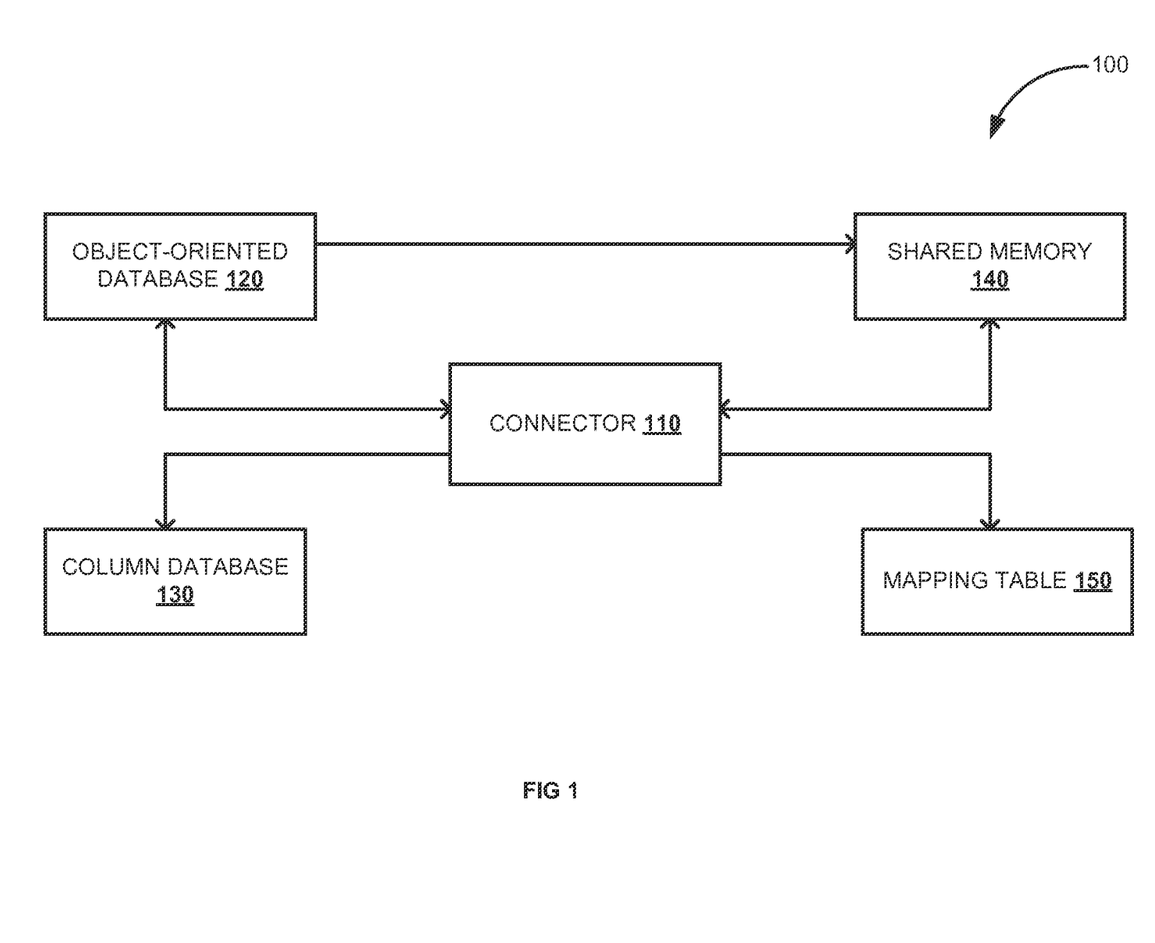
FIG. 1 is a block diagram illustrating an exemplary databases integrating environment for integrating co-deployed databases, according to an embodiment.

FIG. 1 is a block diagram illustrating exemplary databases integrating environment 100 comprising a connector 110 for integrating co-deployed databases, e.g., object-oriented database 120 and column database 130. The databases may be co-deployed in various ways. For example, the databases may be co-deployed in a same operating system or one database may be deployed as an add-on to the other database. Typically, the source database may be deployed as an add-on to the destination database. For example, the object-oriented database 120 may be deployed as an add-on to the column database 130. The co-deployed databases may be integrated using the connector 110. In an embodiment, integrating refers to connecting the databases to keep them synchronized. The co-deployed databases may be synchronized by replicating the data of the source database (e.g., object-oriented database 120) to the target database (column database) on real-time or at a predefined time period. The connector 110 enables the replication or synchronization of data between the co-deployed databases. The connector 110 may be a pre-programmed software comprising a task or a thread. The connector 110 may be a part of the operating system or a database. The connector 110 may be a part of the operating system when the databases are co-deployed in the operating system. In an embodiment, the connector 110 may be a part of the destination database when the source database is co-deployed as an add-on to the destination database. The connector 110 integrates the co-deployed databases, e.g., the object-oriented database 120 and the column database 130. The connector 110 synchronizes the co-deployed databases by replicating the source database to the destination database. In an embodiment, the change, e.g., edited data or added data, from the source database is replicated to the destination database. For example, when there is any change in the object-oriented database 120 that change is replicated in the column database 130.

When there is any change in the source database, e.g., the object-oriented database 120, an event is triggered by the source database. The change may comprise at least one of addition of data, deletion of data, and updating of data in the source database. Based upon the change, the event is triggered by the source database, e.g., the object-oriented database 120. The event may be triggered or created by writing the change in a shared memory 140. The data change may be written with one or more key fields of the source database. The key field refers to one or more fields in a record (row) that holds unique data which identifies that record from all the other records in the source database. In an embodiment, the event may be triggered by creating a "change log." A "change log" refers to a set of all the changes made in the source database. In an embodiment, the source database may directly notify the change to the connector 110. In an embodiment, key field(s) and the change data is stored in the "change log." In an embodiment, the change value or data is also written in the shared memory 140 along with the key fields. The triggered event may be received or read by the connector 110. For example, the connector 110 may read the triggered event from the shared memory 140 or by reading the change log. In an embodiment, the shared memory 140 may be a part of the operating system or the database.

Upon reading or receiving the triggered event, the connector 110 reads the changed data from the source database, e.g., the object-oriented database 120. In an embodiment, the event itself includes the changed data. Upon reading the changed data, the connector 110 refers to a mapping table 150. In an embodiment, the connector 110 refers to the mapping table 150 prior to reading the data from the object-oriented database 120. The mapping table 150 describes the field or data of the source database (object-oriented database 120) that corresponds to or maps to corresponding field of the destination database (column database 130). In an embodiment, upon receiving the event, the connector 110 reads the mapping table 150 to determine which data of the source database is changed and reads the changed data from the source database. The mapping table 150 also indicates which column of the column database 130 is to be updated based upon the changed data. Upon determining the column to be mapped, updated, changed, or edited in the column database 130, the connector 110 updates, writes, or edit that column in the column database 130. Therefore, the source database (object-oriented database 120) and the destination database (column database 130) are synchronized or are replicated. In an embodiment, the replication of data may be performed at a predefined time interval or in real time.

The connector 110, therefore, enable integrating or synchronizing co-deployed databases (e.g., object-oriented database 120 and column database 130) through the task or a thread. The task may be configured and executed within the operating system in which the databases (e.g., object-oriented database 120 and column database 130) are co-deployed. In an embodiment, the task or the thread may be configured and executed in the destination database (column database 130) where the source database (e.g., object-oriented database 120) is co-deployed as an add-on. Therefore, the connector 110, including the task or thread, configured within the operating system or the database itself is used for integrating and synchronizing the co-deployed databases and there is no requirement of a separate machine or a server to perform the integration and synchronization.

Figure 2:
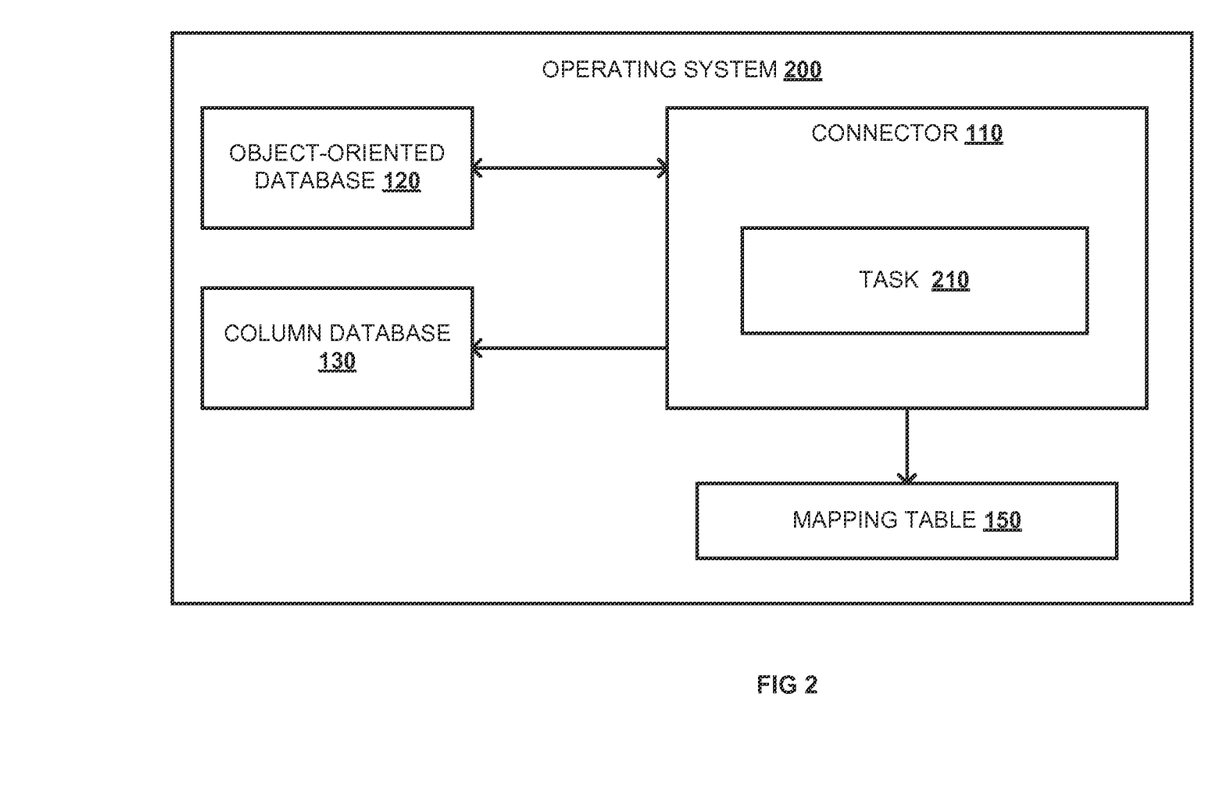
FIG. 2 is a block diagram illustrating databases co-deployed in an operating system, according to an embodiment

FIG. 2 illustrates the source database (e.g., the object-oriented database 120) and the destination database (e.g., the column database 130) co-deployed in an operating system 200. An exemplary object-oriented database 120 may comprise the below database table template namely "employee" including three fields employee identifier (EMP_ID) which is a unique key, employee name (NAME), and employee sex (SEX):

| Employee |
|---|
| EMP_ID |
| NAME |
| SEX |

The object-oriented database 120 may include one or more objects or instances based upon the template of the above database table (employee). For example, the below two objects or instances may be created and stored in the object-oriented database 120.

| Object 1 | Object 2 |
|---|---|
| 001 | 002 |
| abc | xyz |
| M | F |

When there is any change in the above objects (object 1 and object 2) or if any new object is added or created, an event is triggered by the object-oriented database 120. In an embodiment, the object-oriented database 120 may create a "change log" or write the event in the shared memory (e.g., the shared memory 140 of FIG. 1). In art embodiment, the shared memory may be a part of the same operating system 200. For example, if there is a change in name of the object 1 from "abc" to "cde", then an event may be triggered by the object-oriented database 120. The object-oriented database 120 writes the event (e.g., key EMP_ID 001, change in NAME) in the shared memory. In an embodiment, the "change log" or the event itself carries or notifies the changed data or name.

The triggered event is read by the connector 110. In an embodiment, the connector 110 keeps monitoring the shared memory or may monitor it at a pre-defined time interval or the shared memory may itself notify the connector 110 about the event. The connector 110 may be a part of the same operating system 200. In an embodiment, the connector 110 may include a task 210 to integrate or connect the co-deployed databases, e.g., the object-oriented database 120 and the column database 130.

Once the event is received, the connector 110 reads the mapping table 150 to determine which fields of the object-oriented database 120 is changed and is to be read. Based upon the mapping table 150, the connector 110 reads the object-oriented database 120 to read the changed data. The connector 110 may read the object-oriented database 120 to determine the changed data (e.g., new NAME). In an embodiment, the event may itself notify the changed data itself, (e.g., e.g., key EMP_ID 001, change NAME to "cde") in that instance the connector 110 may not read the object-oriented database 120. In an embodiment, when a new record or object is added, the event may not include the added data as it might be large in number. In an embodiment, the connector 110 reads the changed data from the object-oriented database 120 and then reads the mapping table 150 to determine which column of the column database 130 corresponds to the changed data.

An exemplary mapping table may be as below:

| Mapping table | | | |
|---|---|---|---|
| Source table | Fields | Destination table | Fields |
| Employee | EMP_ID | Employee1 | EMP_ID1 |
| Employee | NAME | Employee1 | NAME1 |
| Employee | SEX | Employee1 | SEX1 |

Based upon the above mapping table the column NAME1 of the column table employee1 may be updated with the edited name "cde." An exemplary column table may be as below:

| Employee1 | | |
|---|---|---|
| EMP_ID | NAME1 | SEX1 |
| 001 | abc | M |
| 002 | xyz | F |

The above exemplary database table may be updated as below, based upon the received event:

| Employee1 | | |
|---|---|---|
| EMP_ID | NAME1 | SEX1 |
| 001 | cde | M |
| 002 | xyz | F |

Once the destination or the column database 130 (e.g., table employee1) is updated, replicated, or synchronized, the attended event is removed or erased from the shared memory. In case of "change log," the last or attended "change log" will be marked or stored. In an embodiment, the task 210 for synchronizing the co-deployed databases may be created when required (instantly or dynamically) so that the resources of the operating system 200 may be free and efficiently used. The task 210 is created instantly or dynamically when frequency of the change in the source database is less often. In an embodiment, when frequency of the change in the source database is more often, the task 210 may be continuously running in the operating system 200 to keep the source (object-oriented database 120) and destination databases (column database 130) synchronized.

Figure 3:
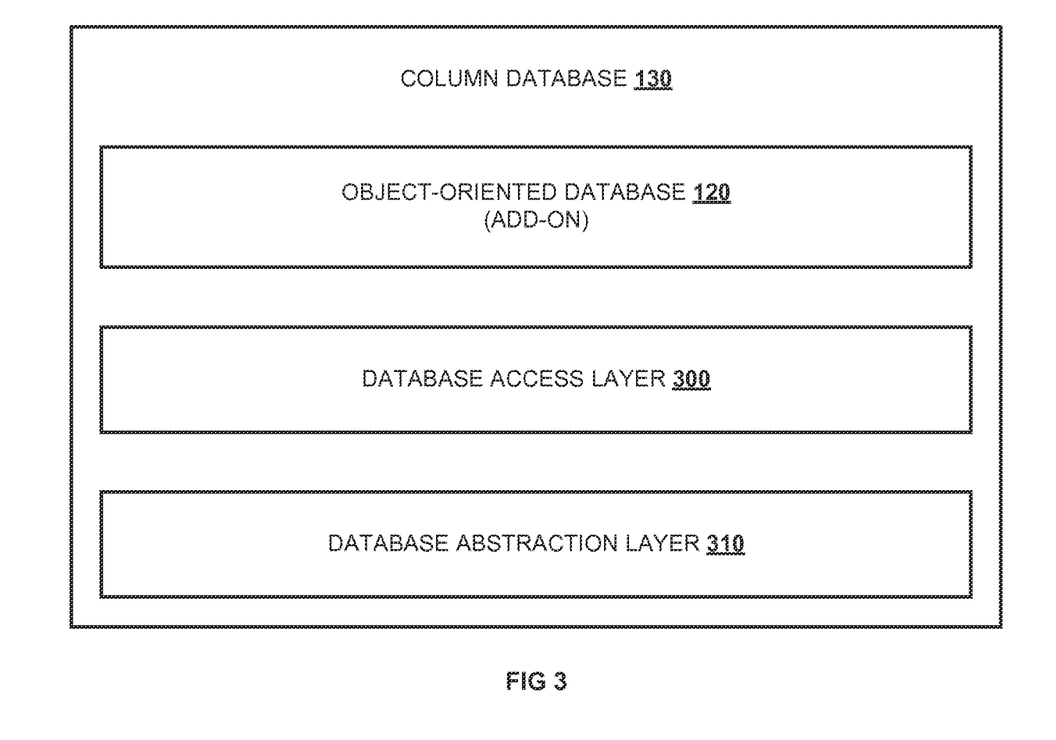
FIG. 3 illustrates a source database co-deployed as an add-on to a destination database, according to an embodiment.

FIG. 3 illustrates a source database (e.g., the object-oriented database 120) co-deployed as an add-on to a destination database (e.g., the column database 130). In an embodiment, the destination database may be deployed as an add-on to the source database. The destination database (e.g., the column database 130) in which the source database (object-oriented database)120) is deployed comprises a common database access layer 300 and a database abstraction layer 310. The database access layer 300 may access both the co-deployed databases namely the object-oriented database 120 and the column database 130. Alternately, the co-deployed databases can access the database access layer 300. The database access layer 300 comprises various common database tools (e.g. DBVisualizer for creating and editing database objects, query tools for querying da(abase, etc.) that can be used by both the co-deployed databases 120 and 130. In an embodiment, the database access layer 300 may include a task or a thread for integrating or connecting the co-deployed databases. A mapping table (not shown) may also be a part of the database access layer 300. In case the object-oriented database 120 is co-deployed as the add-on to the column database 130, the task may be replaced by a thread for integrating the databases. The database abstraction layer 310 is an application programming interface (API) that can also access both the co-deployed databases namely the object-oriented database 120 and the column database 130. The database abstraction layer 310 comprises various database tools such as a backup and recovery tools, logger, transaction manager, authorization manager, etc., and helps in unifying communication between any computer application and the databases namely the object-oriented database 120 and the column database 130. In an embodiment, the database abstraction layer 310 may include the task or the thread for integrating or connecting the co-deployed databases.

Figure 4:
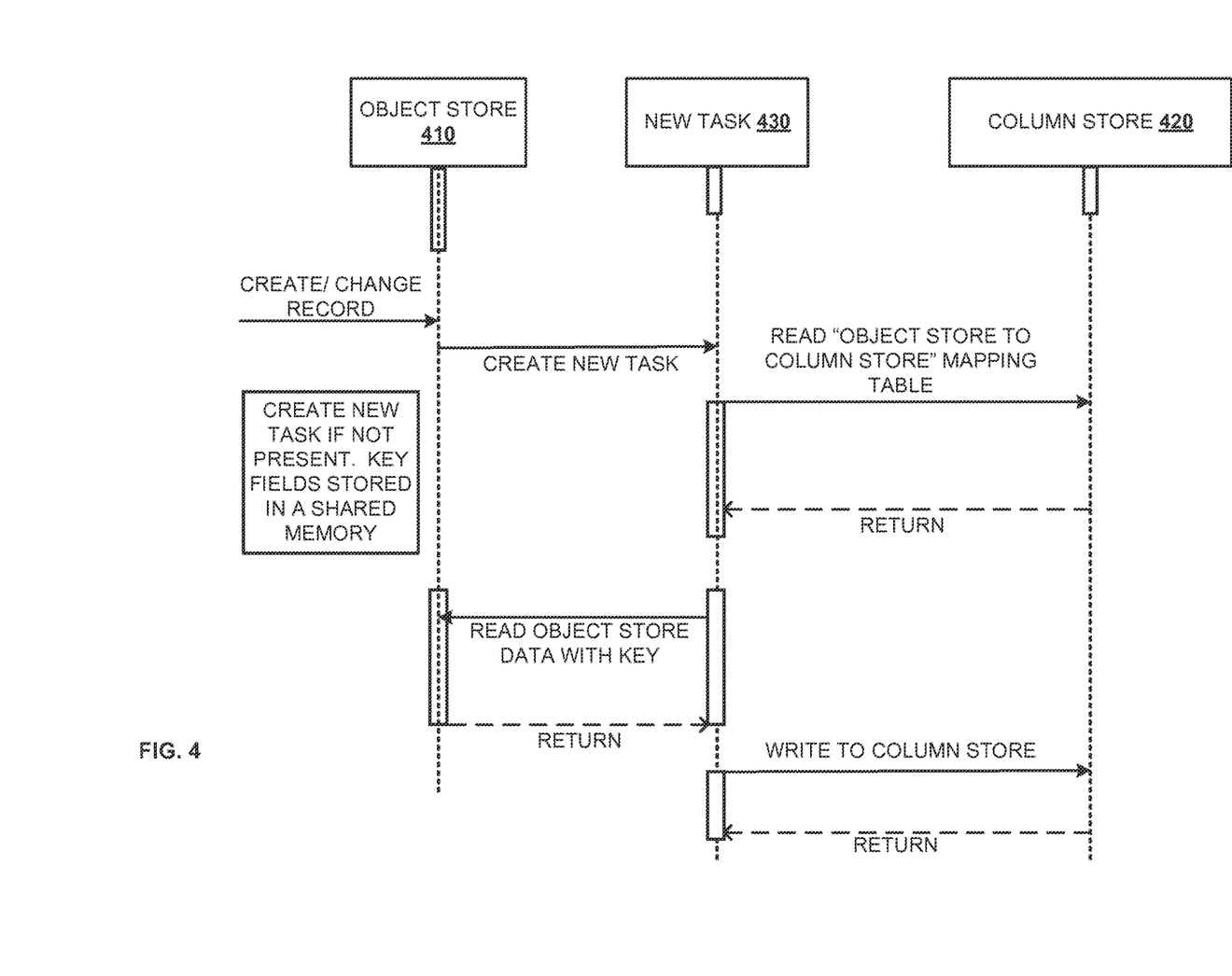
FIG. 4 is a dataflow diagram for integrating co-deployed databases, according to an embodiment.

FIG. 4 is a dataflow diagram for integrating co-deployed databases (e.g., object store 410 and column store 420). The databases may be co-deployed in a same operating system or one database may be deployed as an add-on to the other database. For example, object store 410 may be deployed as an add-on to the column store 420. A task may be preprogrammed for integrating the co-deployed databases. The task may be in the operating system when both the databases are deployed in the same operating system or the task may be a part of the database upon which the other database is deployed as an add-on. In an embodiment, when one database is deployed as an add-on to the other database, a thread can also be used instead of task for integrating the databases. When there is any change in the object store 410 (e.g., when a new record or object is added, data is edited or deleted, etc), it is determined whether the task already exists for replicating the change or data from the object store 410 to the column store 420 to keep the object store 410 to the column store 420 synchronized. When the task is present, the task is activated or executed. When the task is not present, a new task 430 is created. In an embodiment, the task is created by an application (not shown) running in the backend. The object store 410 writes or stores an event indicating the change (e.g., changed data) in a shared memory or buffer. The event may include key fields of the data being changed, added, or updated. The created new task 430 reads the "object store to column store" map or mapping table to determine changed field of the object store 410 and to determine which field of the column store 420 is to be mapped to the changed field of the object store 410. Upon reading the mapping table, the new task 430 reads the shared memory or the object store 410 with key (e.g., key fields). Once the changed data is read, the task 430 writes the updated data in the column store 420 to synchronize the column store 420 with the object store 410.

Once the column store 42,0 is replicated or synchronized, data analytics (e.g., data aggregation, filtering, retrieving data, etc) can be performed easily and efficiently using the column store 420. In an embodiment, various logical models or views can be created onto the column store 420 to efficiently perform data analytics onto the column store 420.

Figure 5:
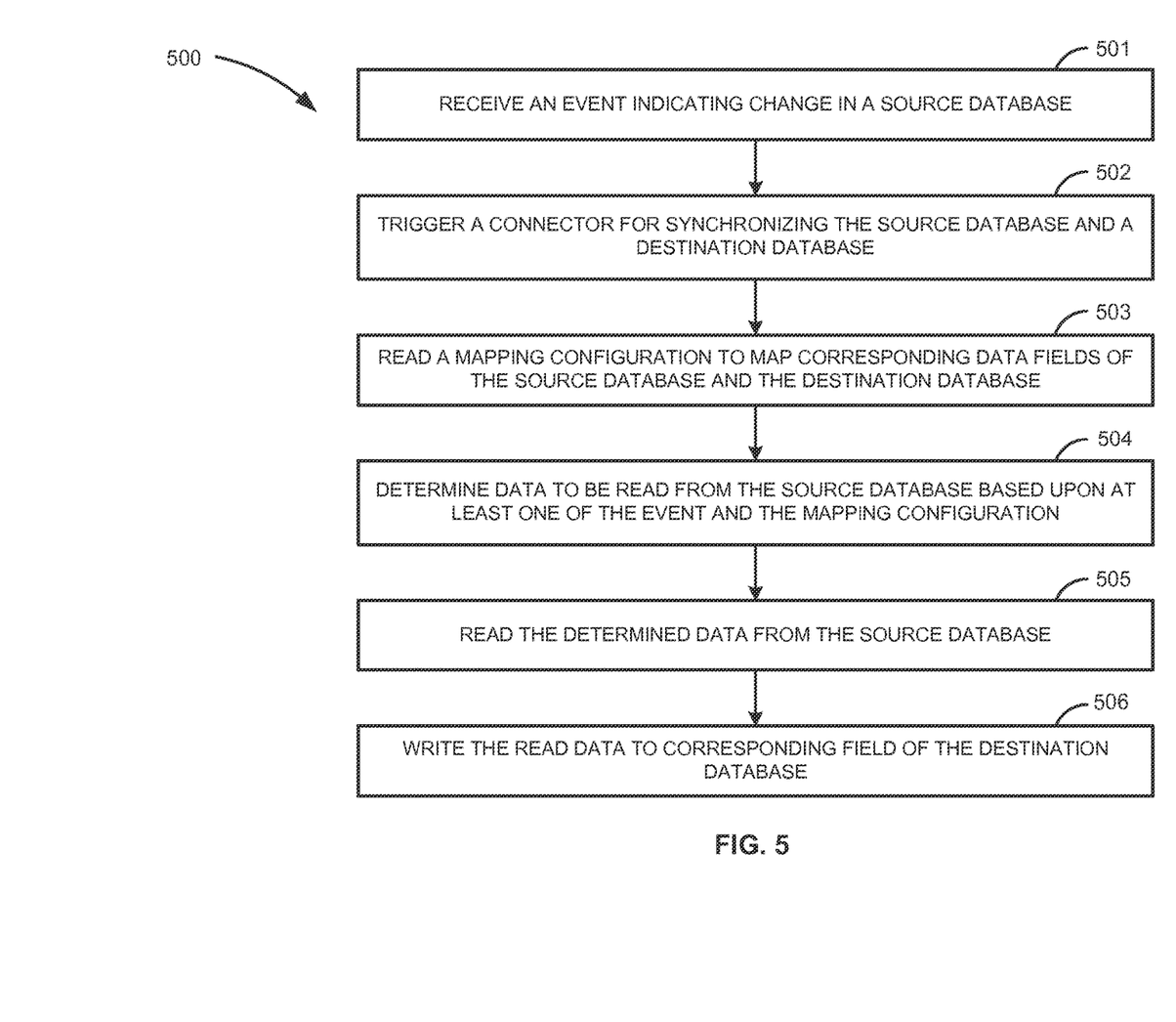
FIG. 5 is a flowchart illustrating a process of integrating and synchronizing the co-deployed databases, according to an embodiment.

FIG. 5 is a flowchart illustrating process 500 to integrate and synchronize co-deployed databases (e.g., the object-oriented database 120 and the column database 130 of FIG. 1). When there is any change in a source database (object-oriented database 120 of FIG. 1), a destination database (column database 130 of FIG. 1) is updated accordingly. The destination database is used for efficient data analytics and is therefore, required to be updated and maintained in sync with the source database (which stores the business data in real time). In an embodiment, a connector (e.g., the connector 110 of FIG. 1) may be used to integrate or connect the co-deployed databases to keep them synchronized. When there is any change in the source database (object-oriented database 120 of FIG.1), an event is triggered. In an embodiment, the event may be triggered by the source database or any suitable software application. In an embodiment, the event may be triggered by writing a notification in a shared memory (e.g., shared memory 140 of FIG. 1), by creating "a change log," or by directly notifying to the connector. At 501, an event is received. The event indicates change in the source database. At 502, once the event is received, the connector is triggered for synchronizing the destination database to the source database. At 503, the connector reads a mapping configuration (e.g., the mapping table 150 of FIG. 1). The mapping configuration is read to identify the data to be read from the source database and to identify the corresponding field to be mapped and updated in the column database. At 504, the data to be read from the source database is determined based upon at least one of the received event and the mapping configuration. At 505, the determined data is read from the source database. At 506, the read data is written to the corresponding field of the destination database.

Embodiments enable integrating or synchronizing co-deployed databases (e.g., object-oriented database and column database) through a task or a thread, therefore, there is no requirement of installing any machine or server for connecting the databases, which saves cost and time. Embodiments also enable replication of data between co-deployed databases using a trigger mechanism. If any data is updated or edited in the object-oriented database then through trigger mechanism that particular edited data is read and updated in the column database which saves time and is efficient.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" includes a single medium or multiple media that stores one or more sets of instructions. The term "computer readable storage medium" includes physical article that is capable of undergoing a set of physical changes to physically store, encode, or otherwise carry a set of instructions for execution by a computer system which causes the computer system to perform the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic indicator devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of or in combination with machine readable software instructions.

Figure 6:
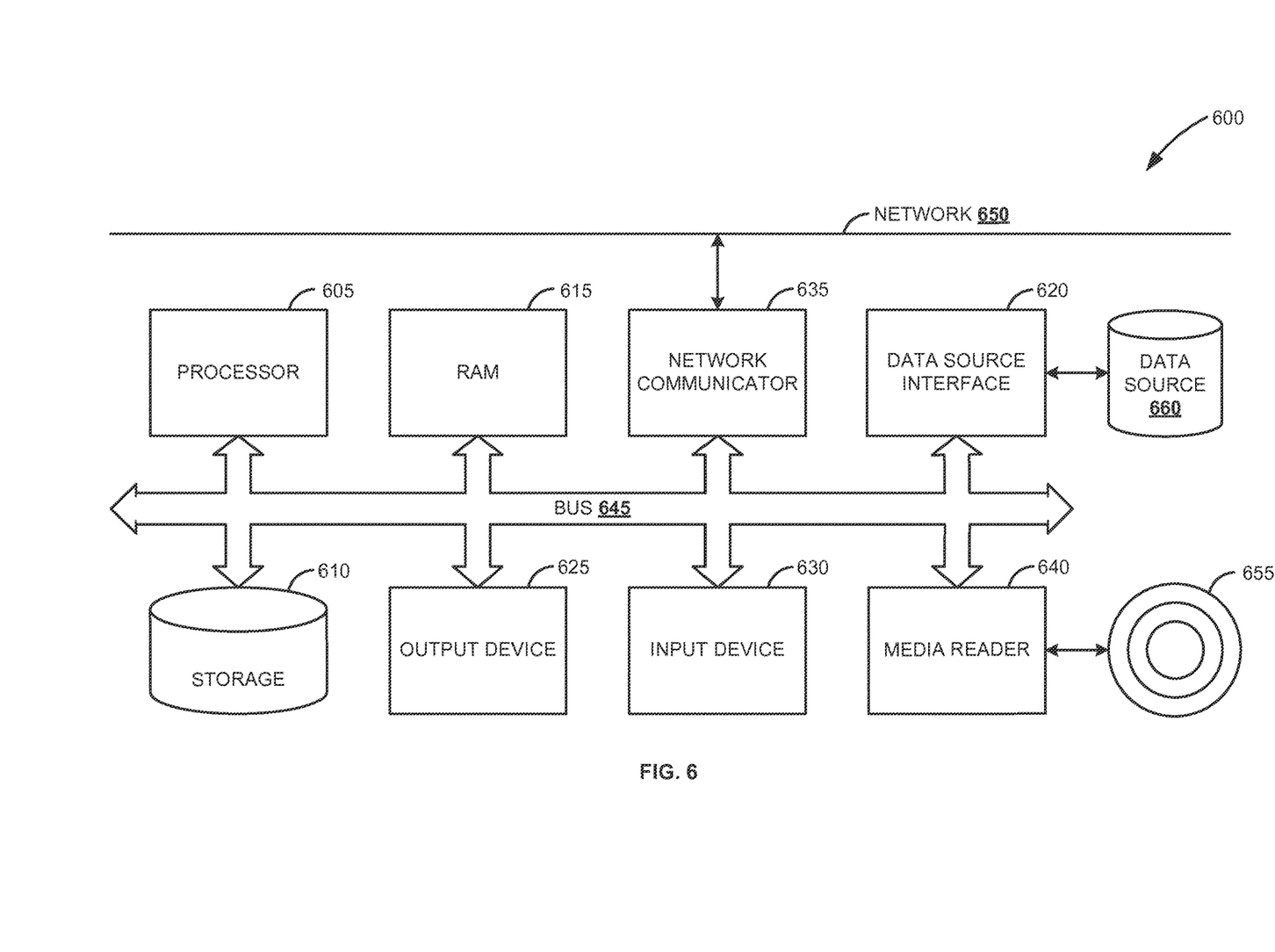
FIG. 6 is a block diagram illustrating an exemplary computer system, according to an embodiment.

FIG. 6 is a block diagram of an exemplary computer system 600. The computer system 600 includes a processor 605 that executes software instructions or code stored on a computer readable storage medium 655 to perform the above-illustrated methods. The processor 605 can include a plurality of cores. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. According to some embodiments, such as some in-memory computing system embodiments, the RAM 615 can have sufficient storage capacity to store much of the data required for processing in the RAM 615 instead of in the storage 610. In some embodiments, the data required for processing may be stored in the RAM 615. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. The output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e,g., data in a file system, XML data), files, a plurality of reports, and any other data source accessible through an established protocol, such as, Open Database Connectivity (ODBC), produced by an underlying software system, e.g., an enterprise resource planning (ERP) system, and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the one or more embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiment are described herein for illustrative purposes, various equivalent modifications are possible within the scope of the embodiments, as those skilled in the relevant art will recognize. These modifications can be made to the embodiments in light of the above detailed description. Rather, the scope of the one or more embodiments is to be determined by the following claims, which are to be interpreted in accordance with established doctrines of claim construction.

What is claimed is:

1. A non-transitory computer readable storage medium storing instructions, which when executed by a computer cause the computer to perform operations comprising:
    identifying a source database and a destination database co-deployed within an operating system of a first machine, wherein the source database is one of an object-oriented database and a row database, and the destination database is a column database that stores one or more fields of data as columns;

identifying a connector installed within the operating system of the first machine and configured to synchronize the source database and the destination database;

triggering the connector for synchronizing the source database and the destination database;

reading by the connector, a shared memory to identify an event received from the source database;

reading a mapping configuration to map corresponding data fields of the source database and the destination database;

based upon the received event and the mapping configuration, determining data to be read from the source database;

reading the determined data from the source database; and writing the read data to corresponding data fields of the destination database.

2. The computer readable medium of claim 1, wherein the event is related to one of addition of data to the source database, deletion of data from the source database, and updating of data in the source database.

3. The computer readable medium of claim 2, wherein the event comprises one or more key fields related to the data which is added, deleted, or updated.

4. The computer readable medium of claim 1, wherein the event is received by reading a shared memory or through a change-log.

5. The computer readable medium of claim 4, wherein the connector monitors the shared memory or change-log in real time or at a predefined time interval for determining the event.

6. The computer readable medium of claim 1, further comprising instructions, which when executed by the computer cause the computer to:

executing, by the connector, a task or a thread for integrating the source database and the destination database.

7. A computer-implemented method for synchronizing co-deployed databases, the method comprising:

identifying a source database and a destination database co-deployed within an operating system of a first machine, wherein the source database is one of an object-oriented database and a row database, and the destination database is a column database that stores one or more fields of data as columns;

identifying a connector installed within the operating system of the first machine and configured to synchronize the source database and the destination database;

triggering the connector for synchronizing the source database and the destination database;

reading, by the connector, a shared memory to identify an event received from the source database;

reading a mapping configuration to map corresponding data fields of the source database and the destination database;

based upon the received event and the mapping configuration, determining data to be read from the source database;

reading the determined data from the source database; and writing the read data to corresponding data fields of the destination database.

8. The computer-implemented method of claim 7, wherein reading the shared memory comprises reading a change-log.

9. The computer-implemented method of claim 8, wherein the connector monitors the shared memory or change-log in real time or at a predefined time interval for determining the event.

10. The computer-implemented method of claim 7 further comprising:

executing, by the connector, a task or a thread for integrating the source database and the destination database.

11. A computer system for integrating and synchronizing co-deployed databases, the system comprising:

at least one memory to store executable instructions; and at least one processor communicatively coupled to the at least one memory, the at least one processor configured to execute the executable instructions to:

identify a source database and a destination database co-deployed within an operating system of a first machine, wherein the source database is one of an object-oriented database and a row database, and the destination database is a column database that stores one or more fields of data as columns;

identify a connector installed within the operating system of the first machine and configured to synchronize the source database and the destination database;

trigger the connector for synchronizing the source database and the destination database;

read, by the connector, a shared memory to identify an event received from the source database;

read a mapping configuration to map corresponding data fields of the source database and the destination database;

based upon the received event and the mapping configuration, determine data to be read from the source database;

read the determined data from the source database; and write the read data to corresponding data fields of the destination database.

12. The system of claim 11, wherein the event is related to one of addition of data to the source database, deletion of data from the source database, and updating of data in the source database and wherein the event comprises one or more key fields related to the data which is added, deleted, or updated.

13. The system of claim 11, wherein reading the shared memory comprises reading a change-log.

14. The system of claim 13, wherein the connector monitors the shared memory or change-log in real time or at a predefined time interval for determining the event.

15. The system of claim 11, wherein the processor is further configured to execute the executable instructions to:

execute the task or a thread for integrating the source database and the destination database.

* * * * *